(12) United States Patent
Brock et al.

(10) Patent No.: US 7,076,556 B1
(45) Date of Patent: Jul. 11, 2006

(54) METHOD AND APPARATUS FOR STORAGE AND RETRIEVAL OF CONNECTION DATA IN A COMMUNICATIONS SYSTEM

(75) Inventors: John Christopher Brock, Union City, CA (US); Charles K. Fadel, Chelmsford, MA (US); Kevin Riley, Tyngsboro, MA (US)

(73) Assignee: Cisco Technology, Inc., San Jose, CA (US)

( * ) Notice: Subject to any disclaimer, the term of this patent is extended or adjusted under 35 U.S.C. 154(b) by 705 days.

(21) Appl. No.: 09/628,614

(22) Filed: Jul. 31, 2000

(51) Int. Cl.
*G06F 15/16* (2006.01)

(52) U.S. Cl. ........................ 709/228; 709/230

(58) Field of Classification Search ............... 375/231, 375/222, 8, 121; 370/244, 254, 94; 379/27, 379/98.32; 709/222, 203, 231, 223, 227 709/228, 230
See application file for complete search history.

(56) References Cited

U.S. PATENT DOCUMENTS

| | | | | |
|---|---|---|---|---|
| 4,592,069 A | * | 5/1986 | Redding | 375/222 |
| 4,661,857 A | * | 4/1987 | Kondo | 358/439 |
| 4,665,519 A | * | 5/1987 | Kirchner et al. | 370/349 |
| 5,247,546 A | * | 9/1993 | Abbiate et al. | 375/377 |
| 5,313,582 A | * | 5/1994 | Hendel et al. | 710/56 |
| 5,852,631 A |   | 12/1998 | Scott | 375/222 |
| 5,910,959 A |   | 6/1999 | Olafsson et al. | 371/37.1 |
| 6,018,619 A | * | 1/2000 | Allard et al. | 709/224 |
| 6,031,867 A | * | 2/2000 | Johnson et al. | 375/222 |
| 6,052,728 A | * | 4/2000 | Fujiyama et al. | 709/224 |
| 6,091,713 A | * | 7/2000 | Lechleider et al. | 370/248 |
| 6,118,768 A | * | 9/2000 | Bhatia et al. | 370/254 |
| 6,199,110 B1 | * | 3/2001 | Rizvi et al. | 709/227 |
| 6,223,222 B1 | * | 4/2001 | Fijolek et al. | 709/227 |
| 6,374,375 B1 | * | 4/2002 | Yip et al. | 714/715 |
| 6,611,563 B1 | * | 8/2003 | Davis et al. | 375/242 |
| 2001/0049740 A1 | * | 12/2001 | Karpoff | 709/231 |
| 2002/0012388 A1 | * | 1/2002 | Eldumiati et al. | 375/222 |
| 2004/0096044 A1 | * | 5/2004 | Olafsson et al. | 379/93.32 |

FOREIGN PATENT DOCUMENTS

WO    WO 99/31813    6/1999

* cited by examiner

*Primary Examiner*—Paul H. Kang
(74) *Attorney, Agent, or Firm*—Hamilton, Brook, Smith & Reynolds, P.C.

(57) ABSTRACT

A method and apparatus for improved communication in a communications system is disclosed. The improvement involves storing connection data at a client end of a client-server connection within a communications system. Connection data is transmitted from a server communications device to a data access device. This connection data history can later be retrieved and analyzed by a server communications device to assist in the optimal configuration of communication sessions between the data access device and the server communications device within the communications system.

26 Claims, 7 Drawing Sheets

METHOD AND APPARATUS FOR STORAGE AND RETRIEVAL OF CONNECTION DATA IN A COMMUNICATIONS SYSTEM

BACKGROUND OF THE INVENTION

This invention relates generally to improving data access device performance in a communications system, and more specifically to storage and retrieval of connection data in a communications system.

Connection data relates to the parameters used in establishing a communication session in a communications system. For voiceband communications devices typical parameters include the specific communications protocol used (e.g., ITU-T V.32, ITU-T V.90) and transmission rate (e.g., 28.8 Kbps, 33.6 Kbps). Connection data is both used by, and produced by, data access devices and server communications devices in a communications system. Common data access devices include analog modems, digital subscriber line modems, integrated services digital network modems, cable modems, power line modems and wireless modems.

Currently, any history of connection data must be stored at a server communications device, as data access devices do not provide a facility for connection data storage. Some existing data access devices do store minimal data, but this data is permanently stored (hardwired) in the device and not placed there by a server communications device. An example of permanently stored data on a data access device is the storage of a unique device identifier in data access devices manufactured by Conexant Systems, Inc. of Newport Beach, Calif. This identifier can be accessed by a server communications device, but neither the server communications device, nor the data access device itself can store additional information (e.g., connection data history) on the data access device.

SUMMARY OF THE INVENTION

Since a history of connection data can not currently be stored on a data access device, an alternative technique is to store connection data on a server communications device. Storing connection data on server communications devices presents problems of both storage capacity and data management. Connection data history can grow quite large, with no efficient way of determining what data to keep and what data to delete when the storage capacity of a server communications device is reached. These storage capacity and data management problems prevent effective use of connection data history for configuring optimal sessions in data communications systems. Thus, an effective technique for managing connection data is required.

Accordingly, the present invention provides a method and apparatus for storage and retrieval of connection data in a communications system by storing connection data on a data access device. The connection information can later be retrieved and used for optimal configuration of devices in the communications system, as well as for producing statistical reports of communication system usage. The present invention is similar to the application layer HTTP "cookie" technology, but embodiments of the present invention are implemented at the physical/link layer.

A method for transmitting connection data in a communications system from a server communications device, to a data access device is provided. The method comprises the steps of sending, from the server communications device to the data access device, a storage capability request for determining storage capability of the data access device. A storage capability reply is received at the server communications device, having been sent from the data access device. The connection data from the server communications device is sent to the data access device for storage on the data access device, based upon the storage capability reply. The connection data is retrieved by sending, from a server communications device to a data access device, a connection data request and receiving, at the server communications device, the connection data from the data access device. The connection data that is stored in the data access device is stored in a non-permanent manner. Retrieval of the connection data from the data access device can be requested using offset and length parameters.

The retrieved connection data can be used for reporting on performance characteristics of the communications system as well as for configuring components connected to the communications system in both realtime and non-realtime. Specific connection data, such as recently used Internet Protocol addresses, once retrieved from a data access device, can be stored in routers connected to the communications system to improve Internet access performance. Additionally, where data access devices support reduced training connection protocols, the connection data can be used to assist the reduced training connection protocol, as well as to reset the data access device, such that the reduced training connection protocol is overridden. This reset ability is useful in overriding some reduced training connection protocols, such as the proposed ITU-T V.92 Quick Connect protocol, which can lock a data access device into lower than optimal communications setting because of a lack of connection data history. The present invention makes it possible to enhance the performance of the V.92 Quick Connect protocol without requiring changes to the protocol itself.

Additional advantages of storage of connection data on data access devices include the ability of one server communications device to benefit from connection data stored by a different server communications device. In the example of IP addresses above, a server communications device used by one ISP may retrieve connection data stored by a server communications device used by a different ISP, thus allowing the current server communications device to take advantage of (cache) more recent IP addresses than it could have compiled on its own.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Communications System

Figure 1:
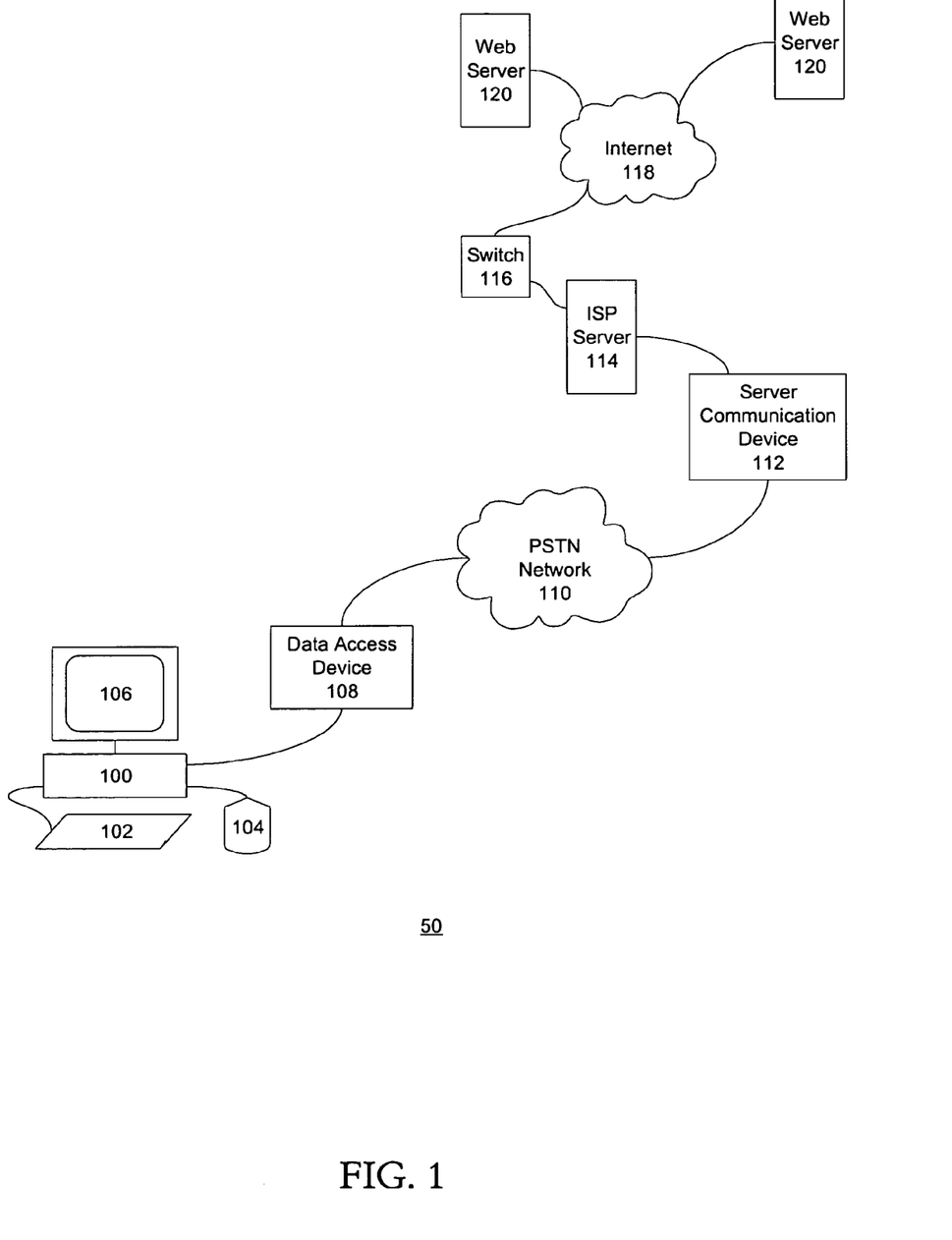
FIG. 1 illustrates a communications system on which an embodiment of the present invention is implemented.

FIG. 1 illustrates a communications system 50 on which an embodiment of the present invention is implemented. A computer 100 provides processing, storage and input/output devices for accessing data through a Public Switched Telephone Network ("PSTN") network 110. Computer 100 is connected to a keyboard 102 and a mouse 104 for receiving input and a display 106 for presentation of output. In one embodiment, computer 100 is a personal computer such as an IBM-compatible or Apple Macintosh computer. Computer 100 is linked to a data access device 108 for accessing PSTN network 110. PSTN network 110 may be a Public Switched Telephone Network, or other network, used for accessing a server communications device 112. The server communications device 112 provides access to an Internet Service Provider through the use of ISP server 114. ISP server 114 uses switch 116 to access the Internet 118, the worldwide collection of computers, networks and gateways that use the TCP/IP suite of protocols to communicate with one another. The Internet 118 provides a backbone of high-speed data communication lines between major nodes or host computers, consisting of thousands of commercial, government, educational, and other computer systems, that route data and messages. Web servers 120 are connected to the Internet 118 and provide data for processing on computer 100.

Data Access Device

Figure 2:
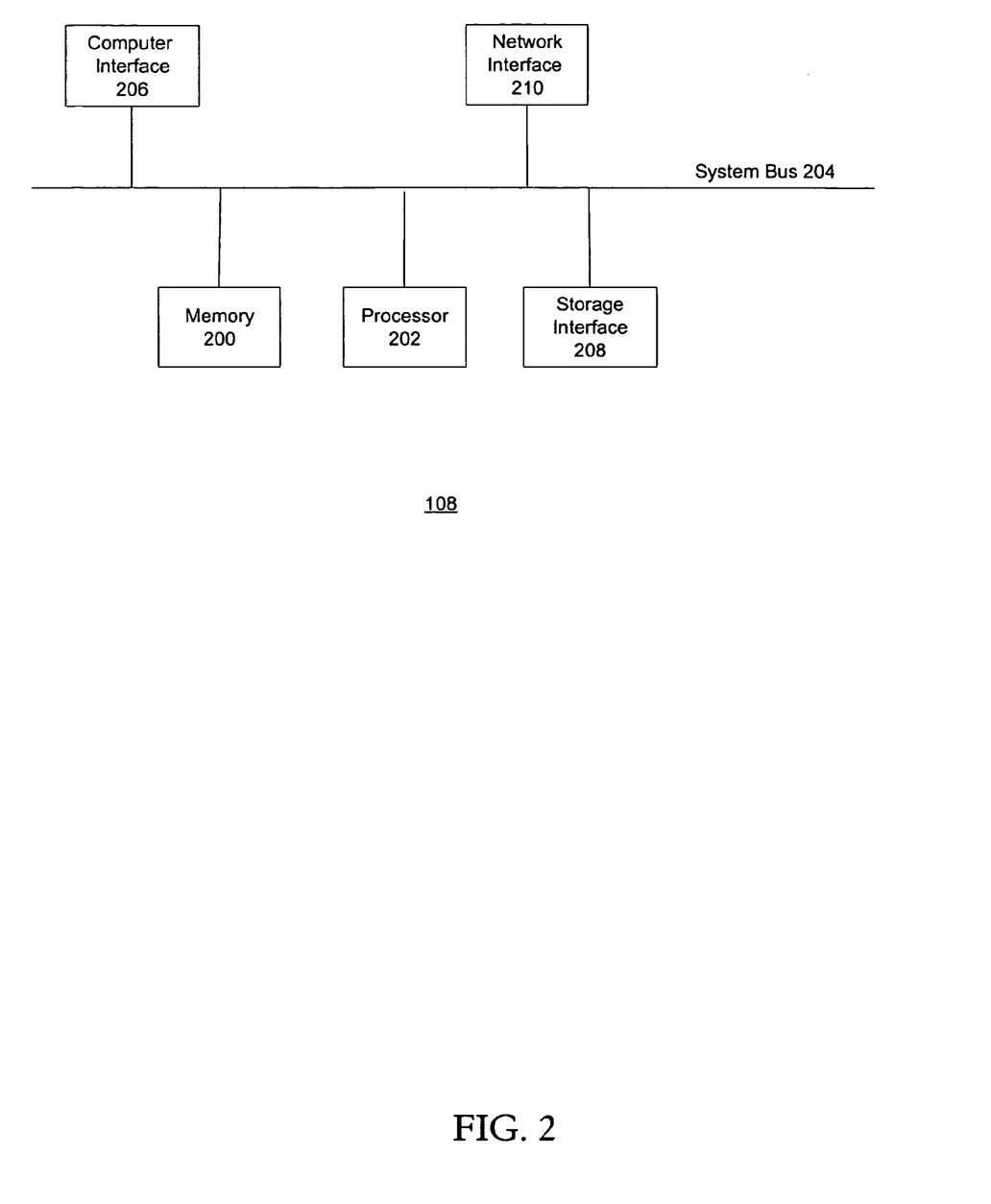
FIG. 2 shows the internal structure of a data access device in the communications system of FIG. 1.

FIG. 2 shows the internal structure of a data access device 108 in the communications system 50 of FIG. 1. The data access device 108 contains a system bus 204, a bus is a set of hardware lines used for data transfer among the components of the data access device 108 on communications system 50. A bus 204 is essentially a shared highway that connects different parts of a system (e.g., processor, disk-drive controller, memory, and input/output ports) which enables the different parts to transfer information. Attached to system bus 204 is computer interface 206, computer interface 206 connects data access device 108 to computer 100. Network interface 210 provides a link to an external network (e.g., PSTN network 110), allowing computer 100 access to other data resources (e.g., ISP server 114 and Web server 120). A memory 200 stores computer software instructions and data used to implement an embodiment of the present invention. Memory 200 is used as a storage/cache for connection data generated by server communications device 112 and connection data generated by data access device 108 itself. Storage of connection data on data access device 108 is managed by storage interface 208. Storage interface 208 presents functionality that allows for querying the status of memory 200, as well as for the storage and retrieval of connection data sent to data access device 108. A processor 202 executes instructions stored in memory 200, allowing the data access device 108 to access data in the communications system 50.

Data Access Device Storage Interface

Data access device storage interface 208 manages a part of memory 200 as a connection data cache. Connection data is stored in the cache by various server communications devices 112. The format of the connection data is determined by server communications devices 112. The stored connection data is accessed using a simple offset/length protocol within the request for connection data. The offset is the number of bytes from the first byte of the connection data cache and length is the number of bytes of connection data requested. One embodiment of the present invention stores connection in a Last-In-First-Out stack arrangement. An alternative to the offset/length protocol is allows the storage interface 208 to return the entire connection data cache in response to a connection data request. Accessability of the stored connection data by server communications devices 112 other than the server communication device 112 which stored the connection data is allowed. Since the format of the stored connection data is determined by the server communications device 112, the format is completely extensible.

Some exemplary functionality of a data access device storage interface 208 includes the ability to:

Accept and reply to requests for storage capabilities of a device access device;

Accept and store connection data set to the data access device;

Acknowledge the storage of a unit of connection data; and

Return a unit (or entire cache) of connection data.

Server Communications Device

Figure 3:
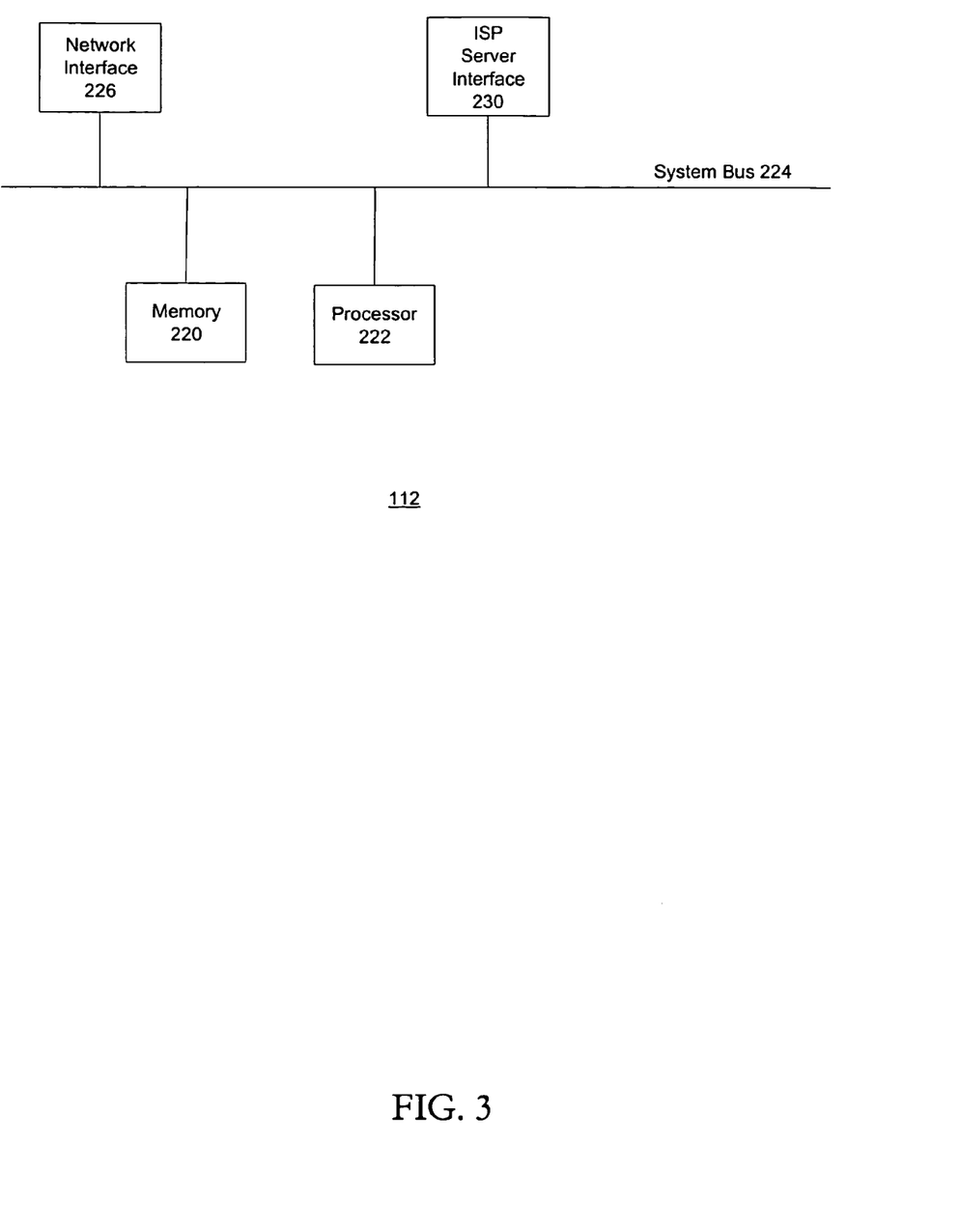
FIG. 3 shows the internal structure of a server communications device in the communications system of FIG. 1.

FIG. 3 shows the internal structure of a server communications device in the communications system of FIG. 1. Server communications device 112 communicates with data access device 108 through PSTN network 110 by negotiating a communications connection. A processor 222 executes instructions stored in memory 220, allowing the server communications device 112 to initiate, manage and terminate communications connections. Network device interface 226 connects communications server device 112 to a network, for example, PSTN network 110. The server communications device 112 contains a system bus 224 used for data transfer among the components of the server communications device 112 on communications system 50. A server communications device 112 services many data access devices 108 by creating multiple communications connections. Connection data for each connection is generated during the negotiation process, the server communications device 112 stores this connection data on respective data access devices 108 that support connection data storage. Connection data server 112 can retrieve previously connection data stored on data access devices 108 during the negotiation of a current connection to improve the throughput or speed of setup of the connection being established. The retrieved data can be stored in memory 220 and processed by processor 222. Communications server device 112 can also interface with other networks (e.g., the Internet 118) through the use of an ISP server interface 230. ISP server interface 230 connects server communications device 112 to ISP server 114, thus allowing data access devices 108 connected to communications server 112 access to data stored on Web servers 120 connected to the Internet 118.

Open Systems Interconnection (OSI) Reference Model

The Open Systems Interconnection (OSI) reference model describes how information from a software application in one computer moves through a network medium to a software application in another computer. The OSI reference model is a conceptual model composed of seven layers, each specifying particular network functions. The model was developed by the International Organization for Standardization (ISO) in 1984, and it is now considered the primary architectural model for intercomputer communications. The OSI model divides the tasks involved with moving information between networked computers into seven smaller, more manageable task groups. A task or group of tasks is then assigned to each of the seven OSI layers. Each layer is reasonably self-contained, so that the tasks assigned to each layer can be implemented independently. This enables the solutions offered by one layer to be updated without adversely affecting the other layers.

The following list details the seven layers of the Open System Interconnection (OSI) reference model:

Layer 7—Application layer
Layer 6—Presentation layer
Layer 5—Session layer
Layer 4—Transport layer
Layer 3—Network layer
Layer 2—Data Link layer
Layer 1—Physical layer The seven layers of the OSI reference model can be divided into two categories: upper layers and lower layers. The upper layers of the OSI model deal with application issues and generally are implemented only in software. The highest layer, application, is closest to the end user. Both users and application-layer processes interact with software applications that contain a communications component. The term upper layer is sometimes used to refer to any layer above another layer in the OSI model. The lower layers of the OSI model handle data transport issues. The physical layer and data link layer are implemented in hardware and software. The other lower layers generally are implemented only in software. The lowest layer, the physical layer, is closest to the physical network medium (the network cabling, for example), and is responsible for actually placing information on the medium.

The OSI model provides a conceptual framework for communication between computers, but the model itself is not a method of communication. Actual communication is made possible by using communication protocols. In the context of data networking, a protocol is a formal set of rules and conventions that governs how computers exchange information over a network medium. A protocol implements the functions of one or more of the OSI layers. A wide variety of communication protocols exist, but all tend to fall into one of the following groups: LAN protocols, WAN protocols, network protocols, and routing protocols. LAN protocols operate at the network and data link layers of the OSI model and define communication over the various LAN media. WAN protocols operate at the lowest three layers of the OSI model and define communication over the various wide-area media. Routing protocols are network-layer protocols that are responsible for path determination and traffic switching. Finally, network protocols are the various upper-layer protocols that exist in a given protocol suite.

Information being transferred from a software application in one computer system to a software application in another must pass through each of the OSI layers. If, for example, a software application running on System A has information to transmit to a software application running on System B, the application program in System A will pass its information to the application layer (Layer 7) of System A. The application layer then passes the information to the presentation layer (Layer 6), which relays the data to the session layer (Layer 5), and so on down to the physical layer (Layer 1). At the physical layer, the information is placed on the physical network medium and is sent across the medium to System B. The physical layer of System B removes the information from the physical medium, and then its physical layer passes the information up to the data link layer (Layer 2), which passes it to the network layer (Layer 3), and so on until it reaches the application layer (Layer 7) of System B. Finally, the application layer of System B passes the information to the recipient application program to complete the communication process.

A given layer in the OSI layers generally communicates with three other OSI layers: the layer directly above it, the layer directly below it, and its peer layer in other networked computer systems. The data link layer in System A, for example, communicates with the network layer of System A, the physical layer of System A, and the data link layer in System B.

One OSI layer communicates with another layer to make use of the services provided by the second layer. The services provided by adjacent layers help a given OSI layer communicate with its peer layer in other computer systems. Three basic elements are involved in layer services: the service user, the service provider, and the service access point (SAP). In this context, the service user is the OSI layer that requests services from an adjacent OSI layer. The service provider is the OSI layer that provides services to service users. OSI layers can provide services to multiple service users. The SAP is a conceptual location at which one OSI layer can request the services of another OSI layer.

The seven OSI layers use various forms of control information to communicate with their peer layers in other computer systems. This control information consists of specific requests and instructions that are exchanged between peer OSI layers.

Control information typically takes one of two forms: headers and trailers. Headers are prepended to data that has been passed down from upper layers. Trailers are appended to data that has been passed down from upper layers. An OSI layer is not required to attach a header or trailer to data from upper layers.

Headers, trailers, and data are relative concepts, depending on the layer that analyzes the information unit. At the network layer, an information unit, for example, consists of a Layer 3 header and data. At the data link layer, however, all the information passed down by the network layer (the Layer 3 header and the data) is treated as data.

In other words, the data portion of an information unit at a given OSI layer potentially can contain headers, trailers, and data from all the higher layers. This is known as encapsulation.

The information exchange process occurs between peer OSI layers. Each layer in the source system adds control information to data and each layer in the destination system analyzes and removes the control information from that data.

If System A has data from a software application to send to System B, the data is passed to the application layer. The application layer in System A then communicates any control information required by the application layer in System B by prepending a header to the data. The resulting information unit (a header and the data) is passed to the presentation layer, which prepends its own header containing control information intended for the presentation layer in System B. The information unit grows in size as each layer prepends its own header (and in some cases a trailer) that contains control information to be used by its peer layer in System B. At the physical layer, the entire information unit is placed onto the network medium.

The physical layer in System B receives the information unit and passes it to the data link layer. The data link layer in System B then reads the control information contained in the header prepended by the data link layer in System A. The header is then removed, and the remainder of the information unit is passed to the network layer. Each layer performs the same actions: the layer reads the header from its peer layer, strips it off, and passes the remaining information unit to the next highest layer. After the application layer performs these actions, the data is passed to the recipient software application in System B, in exactly the form in which it was transmitted by the application in System A.

The physical layer defines the electrical, mechanical, procedural, and functional specifications for activating, maintaining, and deactivating the physical link between communicating network systems. Physical layer specifications define characteristics such as voltage levels, timing of voltage changes, physical data rates, maximum transmission distances, and physical connectors. Physical-layer implementations can be categorized as either LAN or WAN specifications.

The data link layer provides reliable transit of data across a physical network link. Different data link layer specifications define different network and protocol characteristics, including physical addressing, network topology, error notification, sequencing of frames, and flow control. Physical addressing (as opposed to network addressing) defines how devices are addressed at the data link layer. Network topology consists of the data link layer specifications that often define how devices are to be physically connected, such as in a bus or a ring topology. Error notification alerts upper-layer protocols that a transmission error has occurred, and the sequencing of data frames reorders frames that are transmitted out of sequence. Finally, flow control moderates the transmission of data so that the receiving device is not overwhelmed with more traffic than it can handle at one time.

The Institute of Electrical and Electronics Engineers (IEEE) has subdivided the data link layer into two sublayers: Logical Link Control (LLC) and Media Access Control (MAC). The Logical Link Control (LLC) sublayer of the data link layer manages communications between devices over a single link of a network. LLC is defined in the IEEE 802.2 specification and supports both connectionless and connection-oriented services used by higher-layer protocols. IEEE 802.2 defines a number of fields in data link layer frames that enable multiple higher-layer protocols to share a single physical data link. The Media Access Control (MAC) sublayer of the data link layer manages protocol access to the physical network medium. The IEEE MAC specification defines MAC addresses, which enable multiple devices to uniquely identify one another at the data link layer.

The network layer provides routing and related functions that enable multiple data links to be combined into an internetwork. This is accomplished by the logical addressing (as opposed to the physical addressing) of devices. The network layer supports both connection-oriented and connectionless service from higher-layer protocols. Network-layer protocols typically are routing protocols, but other types of protocols are implemented at the network layer as well. Some common routing protocols include Border Gateway Protocol (BGP), an Internet interdomain routing protocol; Open Shortest Path First (OSPF), a link-state, interior gateway protocol developed for use in TCP/IP networks; and Routing Information Protocol (RIP), an Internet routing protocol that uses hop count as its metric.

The transport layer implements reliable internetwork data transport services that are transparent to upper layers. Transport-layer functions typically include flow control, multiplexing, virtual circuit management, and error checking and recovery. Flow control manages data transmission between devices so that the transmitting device does not send more data than the receiving device can process. Multiplexing enables data from several applications to be transmitted onto a single physical link. Virtual circuits are established, maintained, and terminated by the transport layer. Error checking involves creating various mechanisms for detecting transmission errors, while error recovery involves taking an action, such as requesting that data be retransmitted, to resolve any errors that occur. Some transport-layer implementations include Transmission Control Protocol, Name Binding Protocol, and OSI transport protocols. Transmission Control Protocol (TCP) is the protocol in the TCP/IP suite that provides reliable transmission of data. Name Binding Protocol (NBP) is the protocol that associates AppleTalk names with addresses. OSI transport protocols are a series of transport protocols in the OSI protocol suite.

The session layer establishes, manages, and terminates communication sessions between presentation layer entities. Communication sessions consist of service requests and service responses that occur between applications located in different network devices. These requests and responses are coordinated by protocols implemented at the session layer. Some examples of session-layer implementations include Zone Information Protocol (ZIP), the AppleTalk protocol that coordinates the name binding process; and Session Control Protocol (SCP), the DECnet Phase IV session-layer protocol.

The presentation layer provides a variety of coding and conversion functions that are applied to application layer data. These functions ensure that information sent from the application layer of one system will be readable by the application layer of another system. Some examples of presentation-layer coding and conversion schemes include common data representation formats, conversion of character representation formats, common data compression schemes, and common data encryption schemes. Common data representation formats, or the use of standard image, sound, and video formats, enable the interchange of application data between different types of computer systems. Conversion schemes are used to exchange information with systems by using different text and data representations, such as EBCDIC and ASCII. Standard data compression schemes enable data that is compressed at the source device to be properly decompressed at the destination. Standard data encryption schemes enable data encrypted at the source device to be properly deciphered at the destination.

Presentation-layer implementations are not typically associated with a particular protocol stack. Some well-known standards for video include QuickTime and Motion Picture Experts Group (MPEG). QuickTime is an Apple Computer specification for video and audio, and MPEG is a standard for video compression and coding. Among the well-known graphic image formats are Graphics Interchange Format (GIF), Joint Photographic Experts Group (JPEG), and Tagged Image File Format (TIFF). GIF is a standard for compressing and coding graphic images. JPEG is another compression and coding standard for graphic images, and TIFF is a standard coding format for graphic images.

The application layer is the OSI layer closest to the end user, which means that both the OSI application layer and the user interact directly with the software application. This layer interacts with software applications that implement a communicating component. Such application programs fall outside the scope of the OSI model. Application-layer functions typically include identifying communication partners, determining resource availability, and synchronizing communication. When identifying communication partners, the application layer determines the identity and availability of communication partners for an application with data to transmit. When determining resource availability, the application layer must decide whether sufficient network resources for the requested communication exist. In synchronizing communication, all communication between applications requires cooperation that is managed by the application layer.

Two key types of application-layer implementations are TCP/IP applications and OSI applications. TCP/IP applications are protocols, such as Telnet, File Transfer Protocol (FTP), and Simple Mail Transfer Protocol (SMTP), that exist in the Internet Protocol suite. OSI applications are protocols, such as File Transfer, Access, and Management (FTAM), Virtual Terminal Protocol (VTP), and Common Management Information Protocol (CMIP), that exist in the OSI suite.

The data and control information that is transmitted through internetworks takes a wide variety of forms. The terms used to refer to these information formats are not used consistently in the internetworking industry but sometimes are used interchangeably. Common information formats include frame, packet, datagram, segment, message, cell, and data unit.

A frame is an information unit whose source and destination are data link layer entities. A frame is composed of the data-link layer header (and possibly a trailer) and upper-layer data. The header and trailer contain control information intended for the data-link layer entity in the destination system. Data from upper-layer entities is encapsulated in the data-link layer header and trailer.

A packet is an information unit whose source and destination are network-layer entities. A packet is composed of the network-layer header (and possibly a trailer) and upper-layer data. The header and trailer contain control information intended for the network-layer entity in the destination system. Data from upper-layer entities is encapsulated in the network-layer header and trailer. The term datagram usually refers to an information unit whose source and destination are network-layer entities that use connectionless network service.

The term segment usually refers to an information unit whose source and destination are transport-layer entities.

A message is an information unit whose source and destination entities exist above the network layer (often the application layer).

A cell is an information unit of a fixed size whose source and destination are data-link layer entities. Cells are used in switched environments, such as Asynchronous Transfer Mode (ATM) and Switched Multimegabit Data Service (SMDS) networks. A cell is composed of the header and payload. The header contains control information intended for the destination data-link layer entity and is typically 5 bytes long. The payload contains upper-layer data that is encapsulated in the cell header and is typically 48 bytes long. The length of the header and the payload fields always are exactly the same for each cell.

Data unit is a generic term that refers to a variety of information units. Some common data units are service data units (SDUs), protocol data units, and bridge protocol data units (BPDUs). SDUs are information units from upper-layer protocols that define a service request to a lower-layer protocol. PDU is OSI terminology for a packet. BPDUs are used by the spanning-tree algorithm as hello messages.

Connection Data Send Protocol

Figure 4:
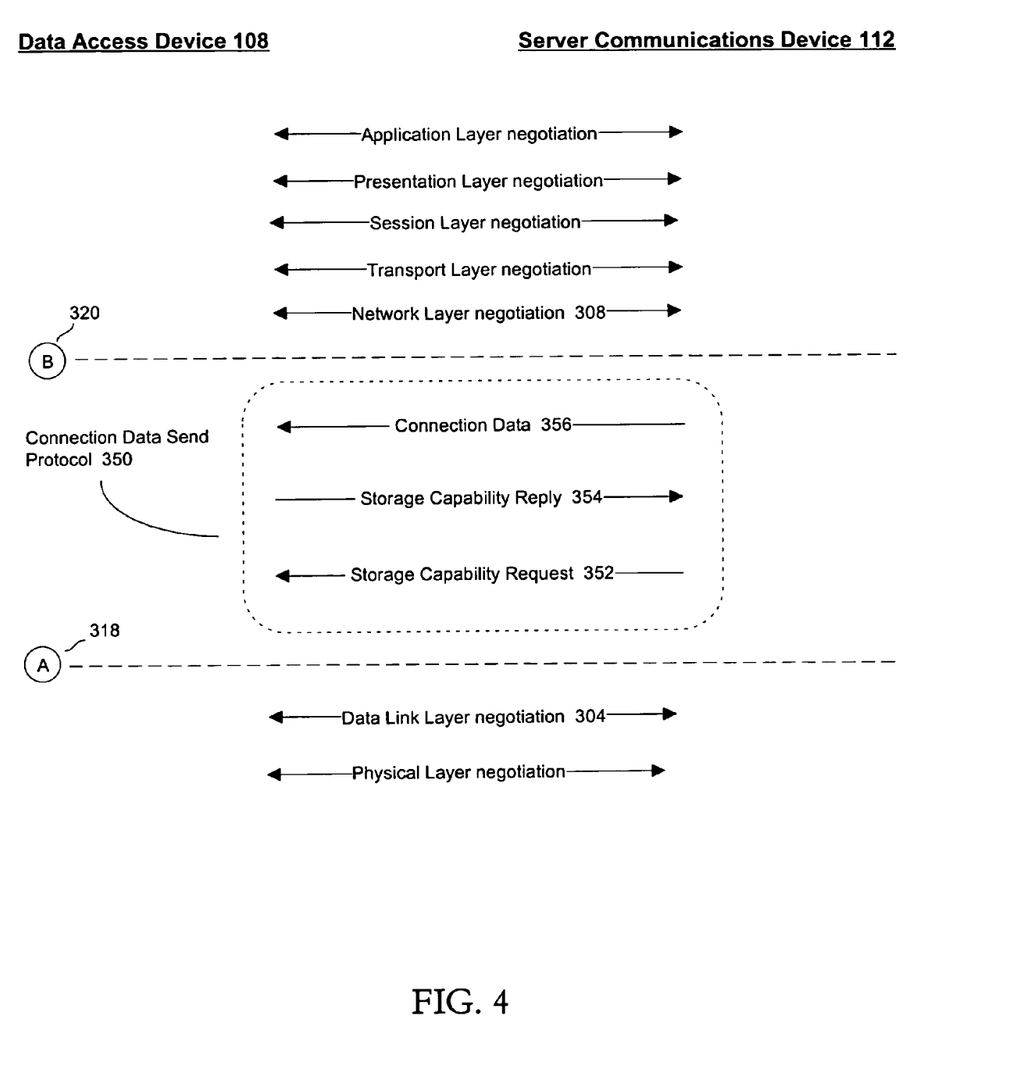
FIG. 4 illustrates the Connection Data Send Protocol as defined according to an embodiment of the present invention at it relates to the Open Systems Interconnection reference model.

FIG. 4 illustrates the Connection Data Send Protocol as defined according to an embodiment of the present invention in relation to the Open Systems Interconnection reference model. The Connection Data Send Protocol 350 runs within Data Link Layer negotiation 304 and Network Layer negotiation 308. All other aspects of OSI layer negotiation occur as described in the Open Systems Interconnection (OSI) Reference Model section above.

Point A 318 indicates the point at which a sufficient base of communications protocols has been established to begin the Connection Data Send Protocol 350. The server communications device 112 initiates a storage capability request 352 to a data access device 108 to determine whether data access device 108 is capable of storing connection data from the server communications device 112. The storage capability request 352 may contain a preferred size, as well as a minimal size, for the connection data it desires to store on the data access device 108. Alternately, the storage capability request 352 may simply query for the existence of storage capability on the data access device 108 and let another process consider actual size requirements and issues (i.e., this information may be in the reply described below).

A storage capability reply 354 is received by server communication device 112 indicating whether or not data access device 108 can satisfy the storage capability request 352. A positive acknowledgment within the storage capability reply 354 prepares the Connection Data Send Protocol 350 for its next step, a negative acknowledgment ends the Connection Data Send Protocol 350. A negative acknowledgment will be assumed in the event that a storage capability reply 354 is not received within a predefined timeout period from the time a respective storage capability request 352 is sent.

When a storage capability reply 354 indicates the availability of storage on the data access device 108, connection data 356 is sent to the data access device 108. The format and content of the connection data 356 is controlled by the server communication device 112 and can vary based upon the purpose for which the server communication device 112 is storing the connection data. For example, if the server communication device 112 is attempting to report statistics on communications line usage it can store connection data in the form of connection-time records. Alternately, if the server communication device 112 is attempting to assist in a data access device training protocol it can store current connection parameters for use in setting communication parameters for a future communications connection. The data access device 108 can, as directed by server communication device 112, provide offset pointer and byte count information, enabling the data access device 108 to transmit a subset of the contents of the connection data cache. This can reduce the time and bandwidth required for connection data transactions. Once the connection data 356 is stored on the data access device 108 an optional acknowledgment can be set by the data access device 108 and received by the server communications device 112 to further insure data integrity. Connection data 356 will often be retrieved using an offset pointer and byte count to prevent the need to upload the entire contents of the connection data cache. At point B 320 further processing of communications protocols in the OSI layers can occur and take advantage of Connection Data Send Protocol 350 supplied connection data 356 on data access device 108.

It is also noted that connection data 356 can originate from the data access device 108 itself and be stored on the data access device 108. A specific server communications device 112 may or may not be able to determine the origin of the connection data 356, be it the data access device 108 itself, this particular server communications device 112, or another server communications device 112.

Connection Data Retrieve Protocol

Figure 5:
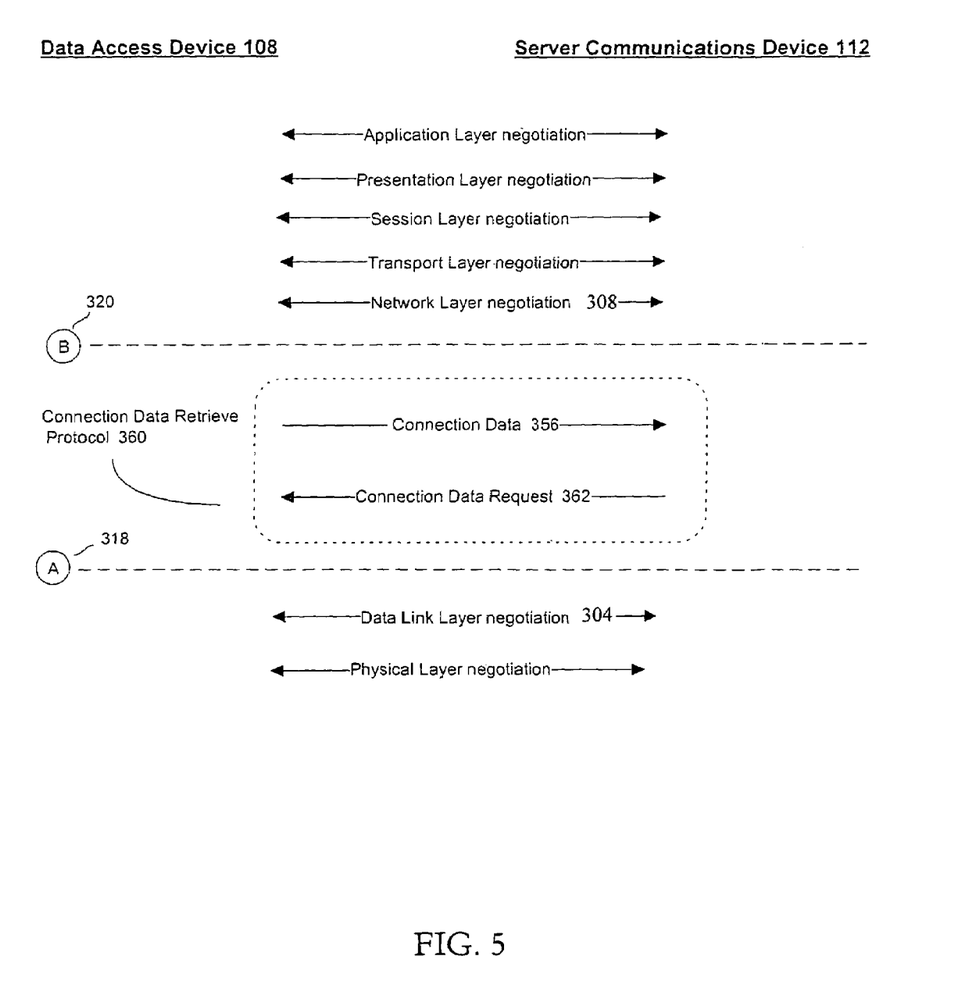
FIG. 5 illustrates the Connection Data Retrieve Protocol as defined according to an embodiment of the present invention as it relates to the Open Systems Interconnection reference model.

FIG. 5 illustrates the Connection Data Retrieve Protocol as defined according to an embodiment of the present invention in relation to the Open Systems Interconnection reference model. The Connection Data Retrieve Protocol 360 runs within Data Link Layer negotiation 304 and Network Layer negotiation 308. All other aspects of OSI layer negotiation occur as described in the Open Systems Interconnection (OSI) Reference Model section above.

Point A 318 indicates the point at which a sufficient base of communications protocols has been established to begin the Connection Data Retrieve Protocol 360. The server communications device 112 initiates a connection data request 362 to a data access device 108 in order to obtain connection data 356. The connection data request 362 may contain specific offset/length parameters for obtaining a subset of the connection data 356 stored on data access device 108 or specific offset/length parameters may be omitted to obtain the full set of connection data 356 stored on data access device 108. The Connection Data Retrieve Protocol 360 will continue even if no connection data 356 can be obtained (e.g., incompatible data access device 108).

Connection data 356 is returned to the server communication device 112. A negative acknowledgment of the connection data request 362 will be assumed in the event that connection data 356 is not received within a predefined timeout period from the time a respective connection data 362 is sent. Since the format and content of the connection data 356 is controlled by the server communication device 112 and can vary based upon the purpose for which the server communication device 112 is storing the connection data. An optional acknowledgment can be set by the data access device 108 to indicate the completion of its connection data send task. At point B 320 further processing of communications protocols in the OSI layers can occur and take advantage of Connection Data Retrieve Protocol 360 supplied connection data 356 on server communications device 112.

Steps of the Connection Data Send Protocol

Figure 6:
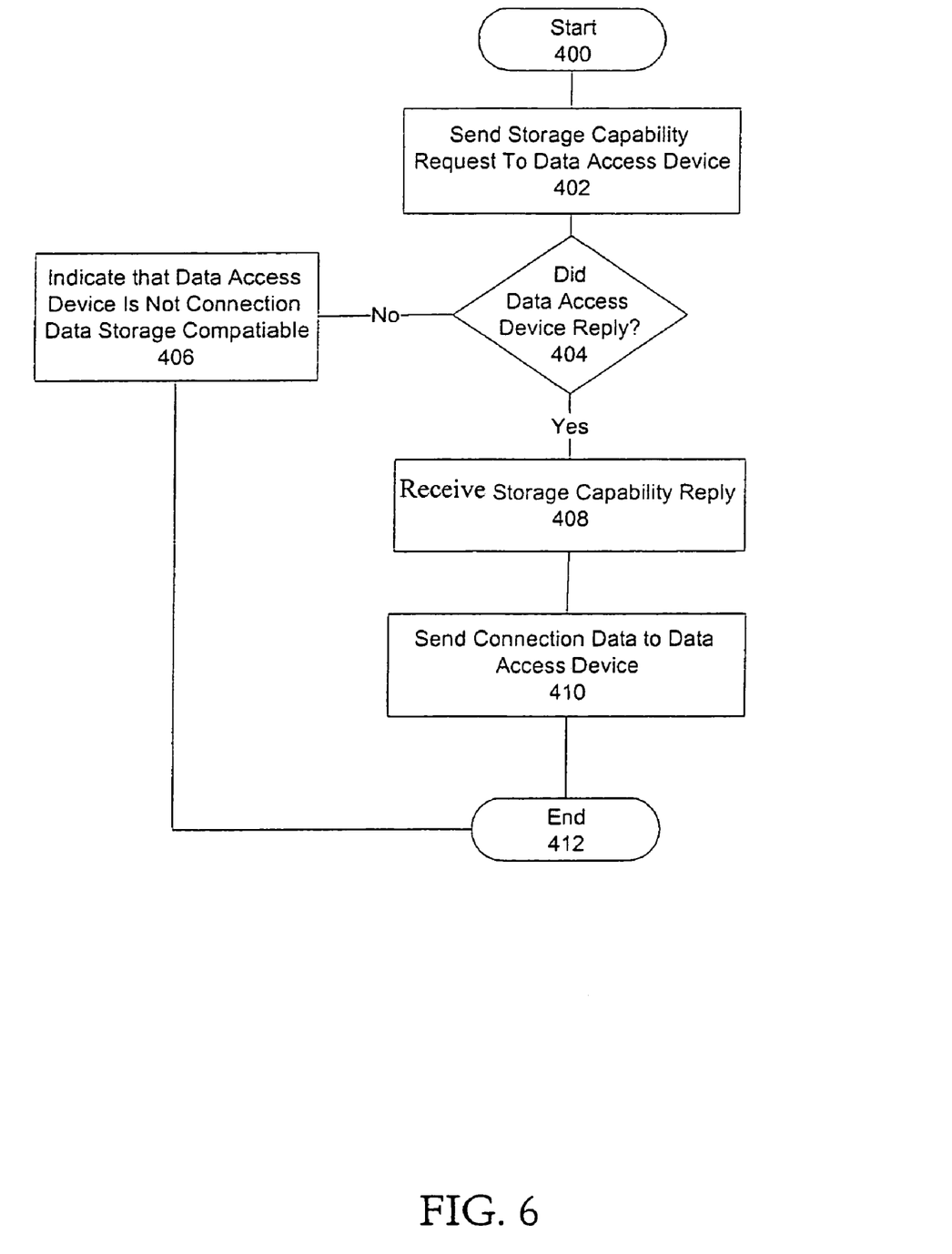
FIG. 6 is a flowchart of steps performed by the Connection Data Send Protocol as defined according to an embodiment of the present invention.

FIG. 6 is a flowchart of steps performed by the Connection Data Send Protocol 350 as defined according to an embodiment of the present invention. The protocol begins at Step 400. A storage capability request 352 (FIG. 4) is sent to data access device 108 in Step 402. At Step 404 the data access device 108 reply to the storage capability request 352 (FIG. 4) is queried. If the data access device 108 does not reply, an indication is made that data access device 108 is not compatible with the Connection Data Send Protocol 350 (Step 406) and the protocol ends at Step 412. If the data access device 108 does reply, server communications device 112 receives the storage capability reply 354 (FIG. 4) at Step 408. At Step 410 the server communications device 112 sends connection data 356 (FIG. 4) to data access device 108. An optional step (not shown) acknowledging receipt of the connection data 356 (FIG. 4) by data access device 108 can occur. The protocol ends at Step 412.

Steps of the Connection Data Retrieve Protocol

Figure 7:
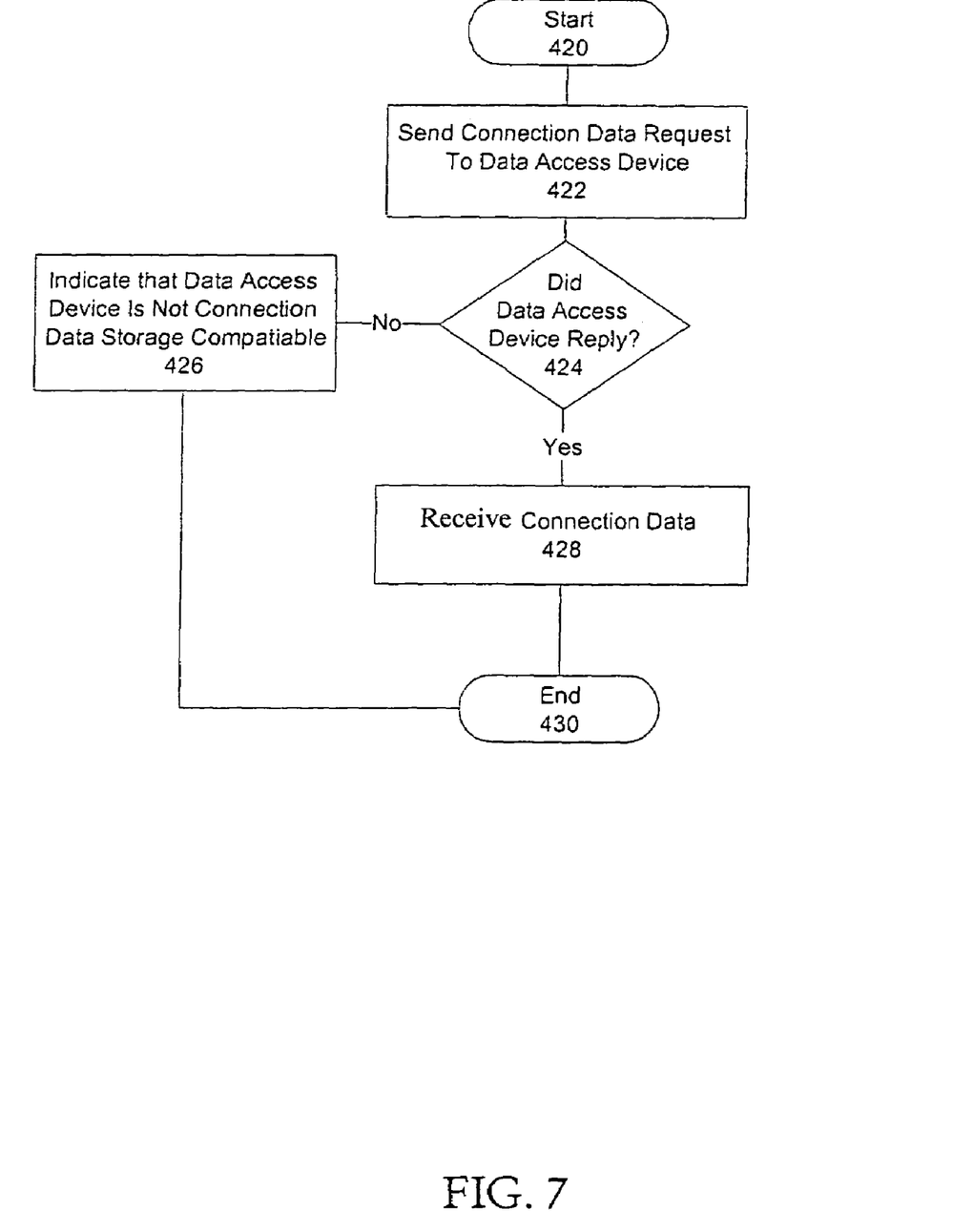
FIG. 7 is a flowchart of steps performed by the Connection Data Retrieve Protocol as defined according to an embodiment of the present invention.

FIG. 7 is a flowchart of steps performed by the Connection Data Retrieve Protocol 360 (FIG. 5) as defined according to an embodiment of the present invention. The protocol begins at Step 420. A connection data request 362 (FIG. 5) is sent to data access device 108 in Step 422, and a data access reply is checked at step 424. If the data access device 108 does not reply an indication is made that data access device 108 is not compatible with the Connection Data Retrieve Protocol 360 (FIG. 5) (Step 426) and the protocol ends at Step 430. If the data access device 108 does reply, server communications device 112 receives the connection data 356 (FIG. 5) at Step 428. An optional step (not shown) acknowledging receipt of the connection data 356 (FIG. 5) by server communication device 112 can occur. The protocol ends at Step 430.

Retraining Data Access Devices During Communications Session Setup

The following example uses an embodiment of the present invention to improve the training of a data access device during the setup of a communications session using an analog modem. The exchange of control messages (and optionally data) between devices can begin using a low speed modulation mode, then progress to higher speeds until a limit of either the client modem or server modem is reached. Training is used by a server modem (server communications device) to identify the capabilities of a client modem (data access device) at the other end of a telephone line. Training negotiates the acceptable parameters for the communications session. Typically, a modem will first acquire the line and test the signal quality on the line by measuring the signal-to-noise ratio. The modem uses the signal-to-noise ratio and compares the resulting value to a transmission rate table. If the value is acceptable, the modem trains at the configured transmission rate. If not, the modem repeats the process, using the next lower transmission rate. The modem keeps trying to train until it is successful, or times out. Once training has established the currently optimal settings for the communications session data transfer begins.

Without the present invention there is no efficient way to store connection data on the client modem, hence client stored connection data can not be used to assist in training the modem. This can result in modems getting "locked-into" communication session parameters (e.g., transmission rates, protocols) that are sub-optimal due to temporal line conditions. Using an embodiment of the present invention the modem training process can take advantage of connection data history stored on the client modem when selecting communication session parameters.

ITU-T V.90 compatible modems, also known as PCM (Pulse Coded Modulation) modems are capable of data transmission speeds up to 56 Kbps. When a V.90 client modem makes an initial connection with a V.90 server modem that connection may be at sub-V.90 rates, due to various external forces on the physical connection. Since an embodiment of the present invention can request connection data from client modem storage, it can retrieve and analyze the stored connection data. If the connection data history indicates that this server modem has a history of connecting to this client modem at rates higher than those initially negotiated it can force a retrain of the client modem. Retraining the client modem may then allow connection at full V.90 rates.

The ITU is considering a new recommendation (V.92) that will allow modems to "quick connect" by avoiding a traditional training sequence in favor of a shorter mechanism. The V.92 Quick Connect specification allows a modem to skip a lonf negotiation procedure and set itself to a V.xx level determined after the last call placed. If the last call was not successful in connecting at the maximum possible speed the modem using V.92 Quick Connect would not negotiate again for a higher session speed, but choose a shorter connect sequence over a faster session speed. Unfortunately, the V.92 Quick Connect mechanism can backfire, especially for users that are borderline capable of establishing PCM (V.90) connections. In those situations the modem could potentially lock-up into negotiating itself once and for all into a lower (e.g., V.34 or below) rate, without the possibility for user-selectable retraining that does not require a manual modem reset. Lock-up can result in less than optimal communication session for modem users and Internet Service Providers ("ISPs").

In one embodiment of the present invention the server (ISP) would send a token to the client modem after each session, storing the resulting session parameters in the client modem (similar to a cookie). After a predefined number of sessions the server would analyze the sessions' throughput. If the analysis detects average session speeds lower than V.90 (or V.34) windows, a second token would be sent to force a retraining of the modem at the time next session connection commences. This allows ISPs to download to a client modem user a fix that allows them to unlock their modems and improve their throughput. For the ISP higher throughput means shorter session times, hence better equipment utilization and better end client experience.

In another embodiment of the present invention connection data stored on the modem could be used to invoke a user interface on a client computer connected to the modem suggesting that the user force a retraining of the modem, separate from the ISP's control.

Another situation in which client stored connection data can be used to improve the performance of a communications system is when a high capacity port frees up on a server modem and a particular client modem needs to be selected to take advantage of the free high capacity port. The server modem can retrieve connection data history from a plurality of client modems. It can then analyze the connection data and select the client modem with the best possibility of utilizing the higher capacity port. This allows for optimal retraining and throughput on the communications system.

The client modem can identify that it can store data tokens when queried and return stored some or all of its tokens (e.g., in a LIFO manner).

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for transmitting connection data in a communications system from a server communications device, to a data access device, comprising the steps of:

sending, from the server communications device, to the data access device, a storage capability request for determining storage capability of the data access device;

receiving, at the server communications device, a storage capability reply from the data access device; and sending, based upon the storage capability reply, connection data from the server communications device to the data access device for storage on the data access device, the connection data associated with a current connection between the server communications device and the data access device, and for subsequent retrieval by the server communications device or another server communications device during a subsequent connection.

2. A method for retrieving connection data in a communications system comprising the step of:

sending, from a server communications device, to a data access device, a connection data request;

receiving, at the server communications device, connection data from the data access device, the connection data associated with one or more prior connections between the server communications device and the data access device, at least a portion of the connection data having been previously sent from the server communications device to the data access device for storage during the one or more prior connections; and storing the connection data in the data access device in a non-permanent manner.

3. The method of claim 2 wherein the connection data request comprises offset and length parameters.

4. The method of claim 2 further comprising the step of:

determining, using the retrieved connection data, a performance characteristic of the communications system.

5. The method of claim 2 further comprising the step of:

configuring, using the retrieved connection data, a component connected to the communications system.

6. The method of claim 5 wherein the retrieved connection data comprises a plurality of recently used Internet Protocol addresses and the step of configuring further comprises storing the Internet Protocol addresses in a router connected to the communications system.

7. The method of claim 2 wherein the data access device supports a reduced training connection protocol and the connection data is used to reset the reduced training connection protocol.

8. The method of claim 7 wherein the reduced training connection protocol is a Quick Connect protocol defined by ITU-T Recommendation V.92.

9. The method of claim 2 wherein the data access device supports a reduced training connection protocol and the connection data is used to indicate that a reset of the reduced training connection protocol should be considered.

10. The method of claim 2 wherein the connection data comprises at least one of a server communications device identifier, a data access device identifier, an Internet Service Provider identifier, a software version identifier, and a recently used Internet Protocol address.

11. The method of claim 2 wherein the data access device is an analog modem, a digital subscriber line modem, an integrated services digital network modem, a cable modem, a power line modem or a wireless modem.

12. An apparatus for transmitting connection data in a communications system from a server communications device, to a data access device, comprising:

a first logic circuit sending a storage capability request message, for determining storage capability of the data access device, from the server communications device to the data access device;

a second logic circuit sending a storage capability reply message from the data access device to the server communications device; and a third logic circuit sending a connection data buffer to the data access device from the server communications device, based upon the storage capability reply message, the connection data associated with a current connection between the server communications device and the data access device, and for subsequent retrieval by the server communications device or another server communications device during a subsequent connection.

13. An apparatus for retrieving connection data in a communications system comprising:

a first logic circuit sending a connection data request message from a server communications device to a data access device, for requesting connection data;

a second logic circuit receiving connection data from the data access device, the connection data associated with one or more prior connections between the server communications device and the data access device, at least a portion of the connection data having been previously sent from the server communications device to the data access device for storage during the one or more prior connections; and wherein the connection data is stored in the data access device in a non-permanent manner.

14. The apparatus of claim 13 wherein the connection data request message comprises offset and length parameters.

15. The apparatus of claim 13 further comprising:

a performance attribute describing a performance characteristic of the communications system, being determining using the retrieved connection data.

16. The apparatus of claim 13 further comprising:

a component, connected to the communications system, configured using the retrieved connection data.

17. The apparatus of claim 16 wherein the retrieved connection data comprises a plurality of recently used Internet Protocol addresses and the component is configured by storing the Internet Protocol addresses in a router connected to the communications system.

18. The apparatus of claim 13 wherein the data access device supports a reduced training connection protocol and the connection data is used to reset the reduced training connection protocol.

19. The apparatus of claim 18 wherein the reduced training connection protocol is a Quick Connect protocol defined by ITU-T Recommendation V.92.

20. The apparatus of claim 13 wherein the data access device supports a reduced training connection protocol and the connection data is used to indicate that a reset of the reduced training connection protocol should be considered.

21. The apparatus of claim 13 wherein the connection data comprises at least one of a server communications device identifier, a data access device identifier, an Internet Service Provider identifier, a software version identifier, and a recently used Internet Protocol address.

22. The apparatus of claim 13 wherein the data access device is an analog modem, a digital subscriber line modem, an integrated services digital network modem, a cable modem, a power line modem or a wireless modem.

23. An apparatus for transmitting connection data in a communications system from a server communications device, to a data access device, comprising:

a first means for sending, from the server communications device, to the data access device, a storage capability request message for determining storage capability of the data access device;

a means for receiving, at the server communications device, a storage capability reply message from the data access device; and a second means for sending, based upon the storage capability reply message, connection data from the server communications device to data access device for storage on the data access device, the connection data associated with a current connection between the server communications device and the data access device, and for subsequent retrieval by the server communications device or another server communications device during a subsequent connection.

24. An apparatus for retrieving connection data in a communications system comprising:

a means for sending, from a server communications device, to a data access device, a connection data request message;

a means for receiving, at the server communications device, connection data from the data access device, the connection data associated with one or more prior connections between the server communications device and the data access device, at least a portion of the connection data having been previously sent from the server communications device to the data access device for storage during the one or more prior connections; and wherein the connection data is stored in the data access device in a non-permanent manner.

25. A computer program product comprising:

a computer usable medium storing a set of computer instructions for:

sending, from the server communications device, to the data access device, a storage capability request for determining storage capability of the data access device;

receiving, at the server communications device, a storage capability reply from the data access device; and sending, based upon the storage capability reply, connection data from the server communications device to data access device for storage on the data access device, the connection data associated with a current connection between the server communications device and the data access device, and for subsequent retrieval by the server communications device or another server communications device during a subsequent connection.

26. A computer program product comprising:

a computer usable medium storing a set of computer instructions for:

sending, from a server communications device, to a data access device, a connection data request;

receiving, at the server communications device, connection data from the data access device, the connection data associated with one or more prior connections between the server communications device and the data access device, at least a portion of the connection data having been previously sent from the server communications device to the data access device for storage during the one or more prior connections; and wherein the connection data is stored in the data access device in a non-permanent manner.

* * * * *